(No Model.)
H. TABOR.
CRANK DISK.
No. 297,313. Patented Apr. 22, 1884.
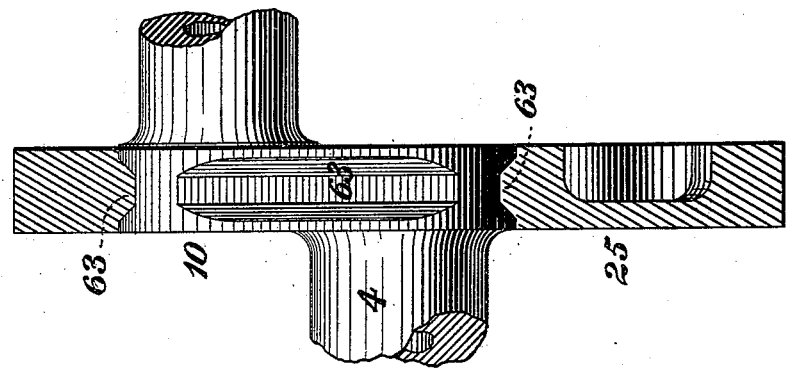
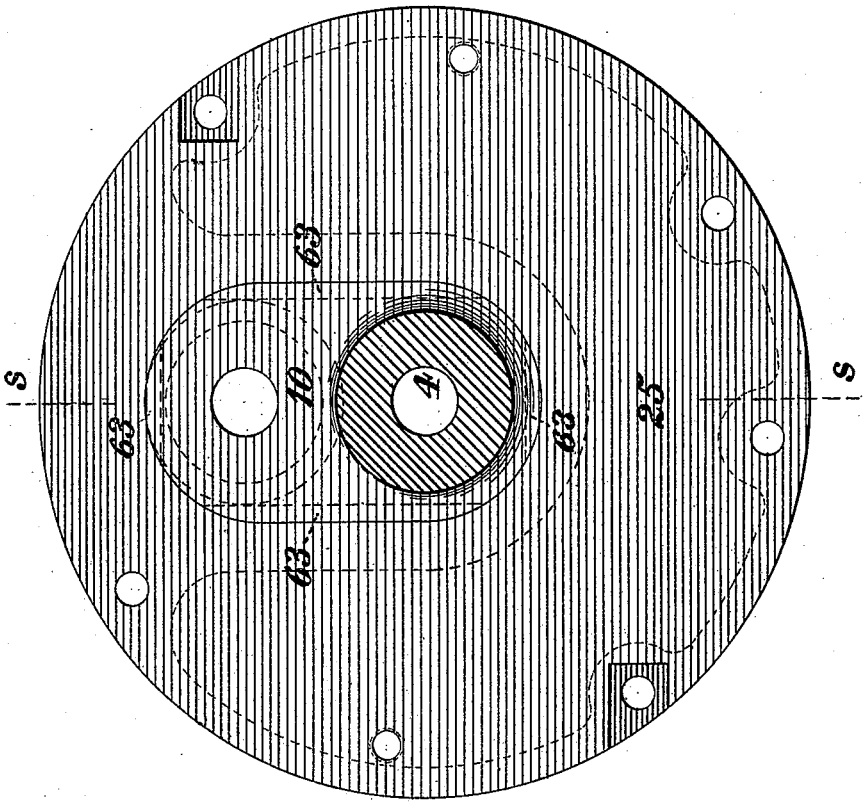
Witnesses:
J. Snowden Bell
O. M. Clarke
Inventor:
Harris Tabor,
By Attorney, George H. Christy

UNITED STATES PATENT OFFICE.

HARRIS TABOR, OF ALLEGHENY, ASSIGNOR TO THE WESTINGHOUSE MACHINE COMPANY, OF PITTSBURG, PENNSYLVANIA.

CRANK-DISK.

SPECIFICATION forming part of Letters Patent No. 297,313, dated April 22, 1884.

Application filed February 28, 1884. (No model.)

*To all whom it may concern:*

Be it known that I, HARRIS TABOR, a citizen of the United States, residing at Allegheny, county of Allegheny, State of Pennsylvania, have invented or discovered a new and useful Improvement in Crank-Disks; and I do hereby declare the following to be a full, clear, concise, and exact description thereof, reference being had to the accompanying drawings, making a part of this specification, in which—like letters indicating like parts—

Figure 1 is a face view of a crank-disk embodying my invention, and Fig. 2 a vertical central section through the same at the line $s$ $s$ of Fig. 1.

The object of my invention is to connect an arm or crank of a crank-shaft with a disk inclosing the same, in such a manner as to economize labor and expense in the operation, and insure such firm and substantial union of the members as shall prevent the possibility of looseness or displacement in operation.

To this end my improvements consist in a crank-disk united to a crank-arm by being cast upon and around the same, and in the combination of a crank-arm and a crank-disk cast around said arm and engaging the same by a tongue and groove or analogous connection.

The improvements claimed are hereinafter more fully set forth.

In the construction of steam-engines it is frequently necessary or desirable, by reason of limited space or otherwise, to locate a plate or disk upon and around a crank-arm, as in the case of pinch-wheels, balance-wheels, and governor-disks, and various means have been employed for connecting the disk and crank, all of which, so far as my knowledge and information extend, have been objectionable in a greater or less degree, by reason of involving difficulty and expense in fitting to insure a sufficiently stable connection, and undue weight and dimensions of the disk and accessories thereof. Moreover, under certain circumstances, as where a disk is to be located upon one of the inner arms of a pair of double cranks, the objections stated are increased by the necessity of employing a disk formed in two sections. My invention obviates the difficulties encountered under prior practice, and is readily applicable to any required conditions and location of the parts.

To carry out my invention, I set the crank-arm 10 of the crank-shaft 4, to which the disk is to be secured, in proper position, and form around it in sand, by the use of a pattern of proper shape, a mold, within which I cast a disk, 25, which completely surrounds the crank 10, concentric with the shaft 4, and which, when solidified, is securely united to the crank 10 without requiring fitting or the use of keys, bolts, or other extraneous members. To prevent the possibility of looseness or displacement of the disk from its position on the crank-arm, I prefer to engage it therewith, in the manner of a tongue-and-groove connection—that is to say, by forming recesses, grooves, or channels in the crank-arm, which are filled by the metal of the disk, or equivalently forming ribs, pins, or projections on the surface of the crank-arm, which are engaged by the metal of the crank which flows and solidifies around them. In the drawings, grooves or channels 63 are shown as formed in the sides and ends of the crank-arm 10, which are engaged by similar tongues formed by the adjacent metal of the disk 25, such engagement effecting a connection of the parts, which renders the disk as efficient in point of strength and stability as if formed in one piece with the crank-arm. A similar result will obviously be attained by a reversal of the relative positions of the engaging-surfaces—that is to say, by forming ribs or projections, in lieu of grooves, upon the crank-arm, and further, detached studs or bosses, or a series of shallow holes, may be substituted as the mechanical equivalents of the grooves or channels 63.

I claim herein as my invention—

1. As a new article of manufacture, a crank-disk which is united to an arm or crank of a crank-shaft by being cast upon and around the same, substantially as set forth.

2. The combination of a crank-arm and a crank-disk cast upon and around the crank-arm, and engaging the same by a tongue-and-groove connection, substantially as set forth.

In testimony whereof I have hereunto set may hand.

HARRIS TABOR.

Witnesses:
J. SNOWDEN BELL,
R. H. WHITTLESEY.